(12) United States Patent
Faitelson et al.

(10) Patent No.: US 7,606,801 B2
(45) Date of Patent: Oct. 20, 2009

(54) AUTOMATIC MANAGEMENT OF STORAGE ACCESS CONTROL

(75) Inventors: Yakov Faitelson, Elkana (IL); Jacob Goldberger, Tel-Aviv (IL); Ohad Korkus, Tel-Aviv (IL)

(73) Assignee: Varonis Inc., Saddle Brook, NJ (US)

( * ) Notice: Subject to any disclaimer, the term of this patent is extended or adjusted under 35 U.S.C. 154(b) by 254 days.

(21) Appl. No.: 11/258,256

(22) Filed: Oct. 25, 2005

(65) Prior Publication Data

US 2006/0277184 A1 Dec. 7, 2006

Related U.S. Application Data

(60) Provisional application No. 60/688,486, filed on Jun. 7, 2005.

(51) Int. Cl.
*G06F 17/30* (2006.01)
*G06Q 20/00* (2006.01)

(52) U.S. Cl. ............. 707/9; 707/10; 707/8; 707/3; 705/64

(58) Field of Classification Search ............. 707/9, 707/8, 6, 5, 7, 205, 3, 10; 705/50, 64, 67
See application file for complete search history.

(56) References Cited

U.S. PATENT DOCUMENTS

| 5,465,387 | A * | 11/1995 | Mukherjee | |
|---|---|---|---|---|
| 7,031,984 | B2 * | 4/2006 | Kawamura et al. | 707/104.1 |
| 7,068,592 | B1 * | 6/2006 | Duvaut et al. | 370/203 |
| 2003/0051026 | A1 * | 3/2003 | Carter et al. | 709/224 |
| 2004/0186809 | A1 * | 9/2004 | Schlesinger et al. | 705/50 |
| 2004/0249847 | A1 * | 12/2004 | Wang et al. | 707/102 |
| 2005/0086529 | A1 * | 4/2005 | Buchsbaum | |

(Continued)

FOREIGN PATENT DOCUMENTS

| CN | 1588889 | | 9/2004 |
|---|---|---|---|
| CN | 1588889 | A * | 9/2004 |

(Continued)

OTHER PUBLICATIONS

Sara c. Madeira and Arlindo L. Oliveira; Biclustering Algorithom for Biological data Analysis: A survey; Mar. 2004; http://www.cs.princeton.edu/courses/archive/spr05/cos598E/bib/bicluster.pdf.*

(Continued)

*Primary Examiner*—Tony Mahmoudi
*Assistant Examiner*—Md. I Uddin
(74) *Attorney, Agent, or Firm*—Gerald T. Shekleton; Husch Blackwell Sanders Welsh & Katz

(57) ABSTRACT

Methods and systems are provided for defining and creating an automatic file security policy and a semi-automatic method of managing file access control in organizations with multiple diverse access control models and multiple diverse file server protocols. The system monitors access to storage elements within the network. The recorded data traffic is analyzed to assess simultaneous data access groupings and user groupings, which reflect the actual organizational structure. The learned structure is then transformed into a dynamic file security policy, which is constantly adapted to organizational changes over time. The system provides a decision assistance interface for interactive management of the file access control and for tracking abnormal user behavior.

20 Claims, 6 Drawing Sheets

U.S. PATENT DOCUMENTS

2005/0108206 A1* 5/2005 Lam et al. ................ 707/3
2005/0203881 A1* 9/2005 Sakamoto et al. ............. 707/3
2005/0278334 A1* 12/2005 Fey et al. ................ 707/9
2006/0064313 A1* 3/2006 Steinbarth et al. ............. 705/1
2006/0184459 A1* 8/2006 Parida ................ 706/1
2006/0184530 A1* 8/2006 Song et al. ................ 707/9
2007/0203872 A1* 8/2007 Flinn et al.

OTHER PUBLICATIONS

Sara C. Madeira; Clustering, Fuzzy Clustering and Biclustering: An Overview; p. 31 to 53; Jun. 27, 2003.*
"Secure Access Control in a Multi-user Geodatabase", Sahadeb De et al., available on the Internet at the URL http://www10.giscafe.com.
U.S. Appl. No. 60/688,486, filed Jun. 7, 2005, entitled: "A Method and System for Automatic Management of Storage Access Control".

* cited by examiner

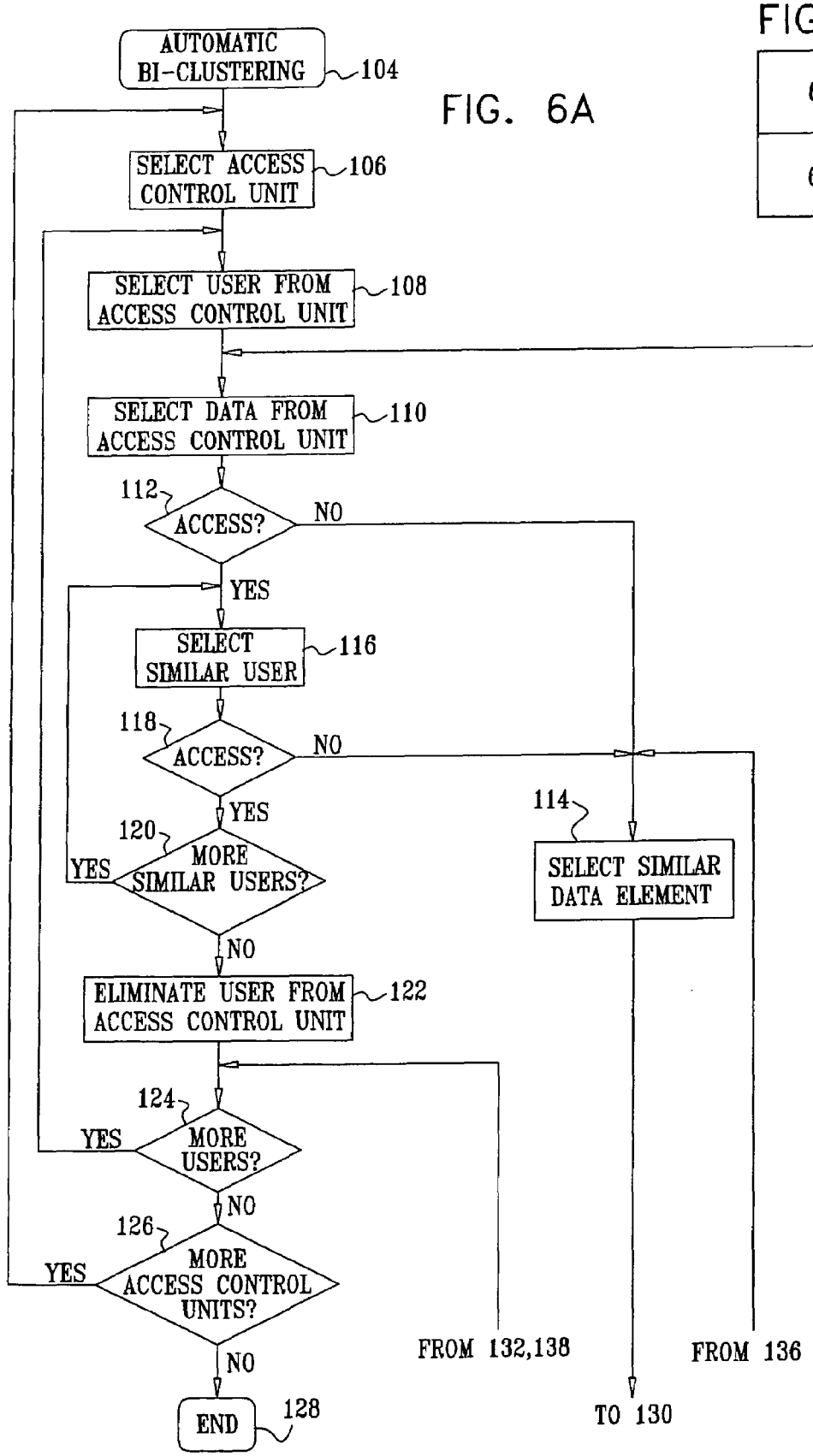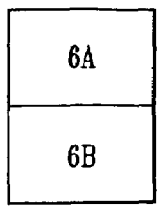

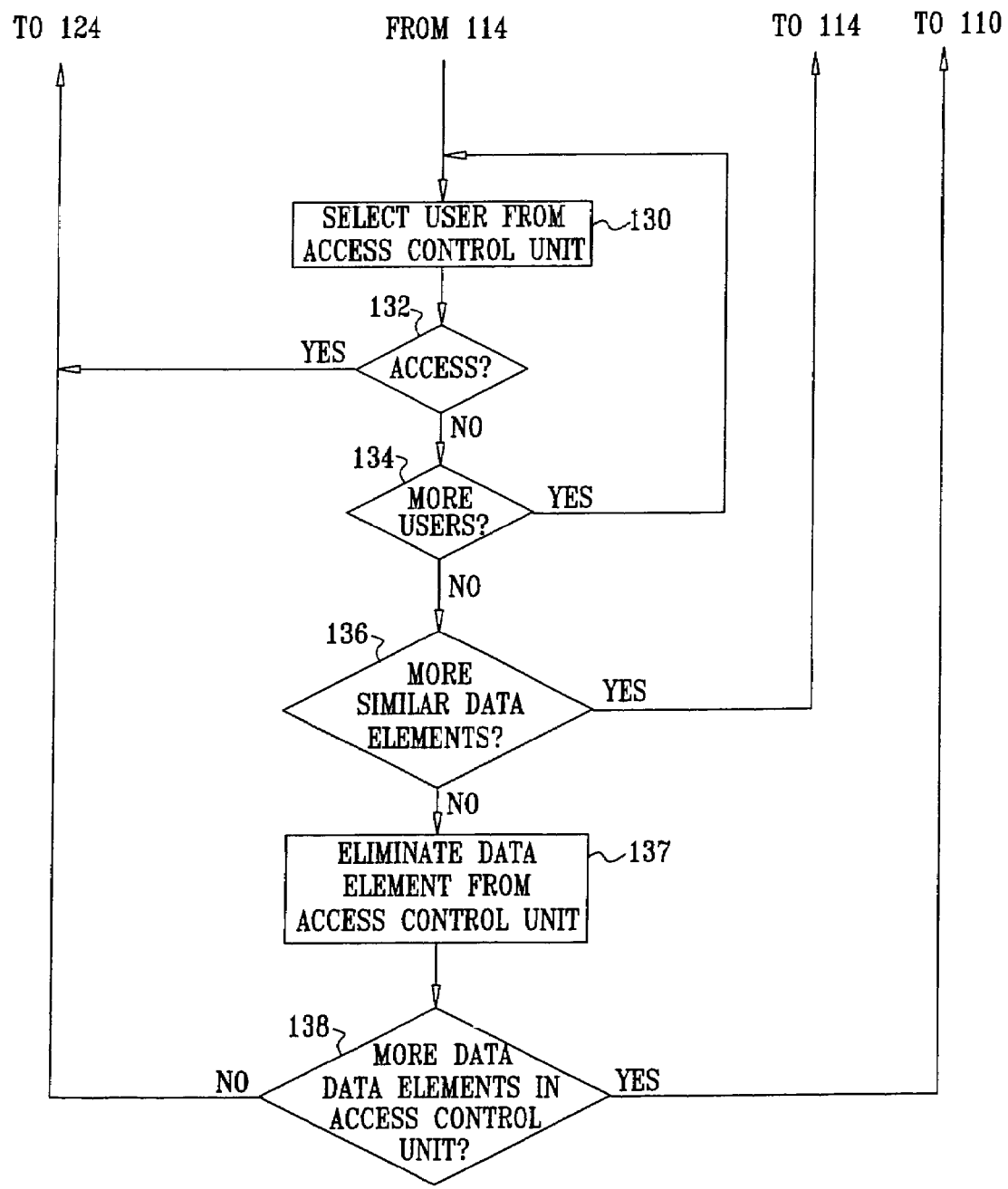

AUTOMATIC MANAGEMENT OF STORAGE ACCESS CONTROL

CROSS-REFERENCE TO RELATED APPLICATIONS

This application claims the benefit of Provisional Application No. 60/688,486, filed Jun. 7, 2005, which is herein incorporated by reference.

BACKGROUND OF THE INVENTION

1. Field of the Invention

This invention relates to computer security. More particularly, this invention relates to the automatic creation and management of file security policies in organizations having a diversity of file access control models.

2. Description of the Related Art

Data security policies typically determine who has access to an organization's stored data on various computer systems. These policies cannot be static. Users from within the organization, e.g., employees, partners, contractors, can pose a threat as severe as threats from outside the organization. Thus, as the structure and personnel makeup of the organization change, the security policy should be adjusted from time to time. Yet, information technology (IT) departments lack effective tools to manage user access rights and to ensure that needed information is conveniently available, while still protecting the organization's sensitive data.

Current techniques available to IT personnel include review and maintenance of access control lists, in conjunction with administration of user names, passwords, and the extension of such techniques to include biometrics, encryption, and limitation of access to a single sign-on. Such techniques are inefficient, often inaccurate, and become impractical in the context of large, complex organizations whose structure and personnel are constantly changing.

Aids to security are available for enterprises using particular operating systems or environments. These are often based on role-based access control, a technique that has been the subject of considerable interest for the last several years by governmental organizations, and has more recently been adopted in commercial enterprises. A typical proposal for role-based access controls in a multi-user SQL database is found in the document *Secure Access Control in a Multi-user Geodatabase*, Sahadeb De et al., available on the Internet.

Nevertheless, access control technlogies have not been optimally implemented in enterprises that utilize diverse access control models. The state of the art today is such that there is no easy way for system administrators to know who is accessing what in such environments. As a result, in many organizations an unacceptably high proportion of users have incorrect access privileges. The related problems of redundant access rights and orphan accounts of personnel who have left the organization have also not been fully solved. Hence, there is a need for an automatic method for controlling user file permissions in order to improve data security, prevent fraud, and improve company productivity.

SUMMARY OF THE INVENTION

According to disclosed embodiments of the invention, methods and systems are provided for automatically creating and managing a data security policy in networked organizations having diverse access control models and file server protocols. Access to storage elements within the organizational network is continually monitored and analyzed in order to define simultaneous data access groupings and user groupings. The actual organizational structure is learned from these groupings, and becomes the basis of a dynamic data access control policy, which is constantly adapted to organizational changes over time. A decision assistance interface is provided for interactive management of the file access control, and a facility is provided for detecting and tracking abnormal user behavior. Organizations are thus able to better control access to their data and applications.

In some embodiments, the techniques are augmented by semi-automatically managing file access control by coordinating the user and data access groupings and conventional access control lists to effect modifications of the lists.

Access control policies developed by applying the teachings of the invention have ancillary benefits, e.g., limiting resource use in the event of a denial-of-service attack.

The invention provides a method for controlling data storage access in an organization, which is carried out by recording accesses of the users to storage elements, and deriving respective user access profiles from the recorded accesses. The method is further carried out by biclustering the users and the storage elements to define user clusters and data clusters, respectively, wherein the access profiles of the users in user clusters are mutually similar, and the storage elements in the data clusters are accessed only by users having mutually similar the access profiles. The method is further carried out responsively to the biclustering, by defining a control policy for access to the storage elements by the users.

According to one aspect of the method, the control policy permits access by a user to storage elements of a data cluster only if at least one of the storage elements in that data cluster has been accessed by that user.

According to an additional aspect of the method, the control policy permits access by the users in a user cluster to the storage elements of a data cluster, only if at least one of the storage elements in that data cluster has been accessed by at least one of the users of that user cluster.

In another aspect of the method the structure of the file system of the storage system is derived from the biclustering process.

A further aspect of the method includes deriving patterns of usage of the file system by the users from the biclustering process.

One aspect of the method includes detecting aberrant patterns of usage.

In yet another aspect of the method, biclustering is performed iteratively, wherein the access profiles are redetermined at each iteration, and the control policy is updated following each iteration.

In still another aspect of the method, defining a control policy is carried out by proposing a tentative version of the control policy, monitoring subsequent accesses to the storage elements by the users, determining that the subsequent accesses are in accordance with the tentative version of the control policy, and responsively to the determination, approving the tentative version as a definitive version of the control policy.

Another aspect of the method includes interactively modifying the control policy.

In a further aspect of the method, defining a control policy is performed automatically and substantially without human intervention.

Yet another aspect of the method includes referencing an access control list including at least one set of users and at least one data set of storage elements, wherein the users of the user set are included in respective ones of the user clusters, and the storage elements of the data set are included in respective ones of the data clusters. The method is further carried out by detecting an absence of accesses by members of the respective user clusters to members of the respective data clusters, and responsively to the lack of accesses, removing at least a portion of the users from the user set and removing at least a portion of the storage elements from the data set.

The invention provides a computer software product, including a computer-readable medium in which computer program instructions are stored, which instructions, when read by a computer, cause the computer to perform a method for controlling data storage access, which is carried out by recording accesses of the users to the storage elements and deriving respective access profiles from the recorded accesses. The method is further carried out by biclustering the users and the storage elements to define user clusters and data clusters, respectively, wherein the access profiles of the users in the user clusters are mutually similar, and the storage elements in the data clusters are accessed only by users having mutually similar the access profiles. The method is further carried out responsively to the biclustering, by defining a control policy for access to the storage elements by the users.

The invention provides an apparatus for controlling data storage access in an organization having users of a file system, including a computer system operative to perform the steps of recording respective accesses of the users to the storage elements and deriving respective access profiles from the recorded accesses, biclustering the users and the storage elements to define user clusters and data clusters, respectively, wherein the access profiles of the users in the user clusters are mutually similar, and the storage elements in the data clusters are accessed only by users having mutually similar the access profiles. The computer system is operative, responsively to biclustering, for defining a control policy for access to the storage elements by the users.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 6A and FIG. 6B, referred to collectively herein as FIG. 6, are a flow chart illustrating a method of semi-automatic file access control in accordance with a disclosed embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

System Overview.

Figure 1:
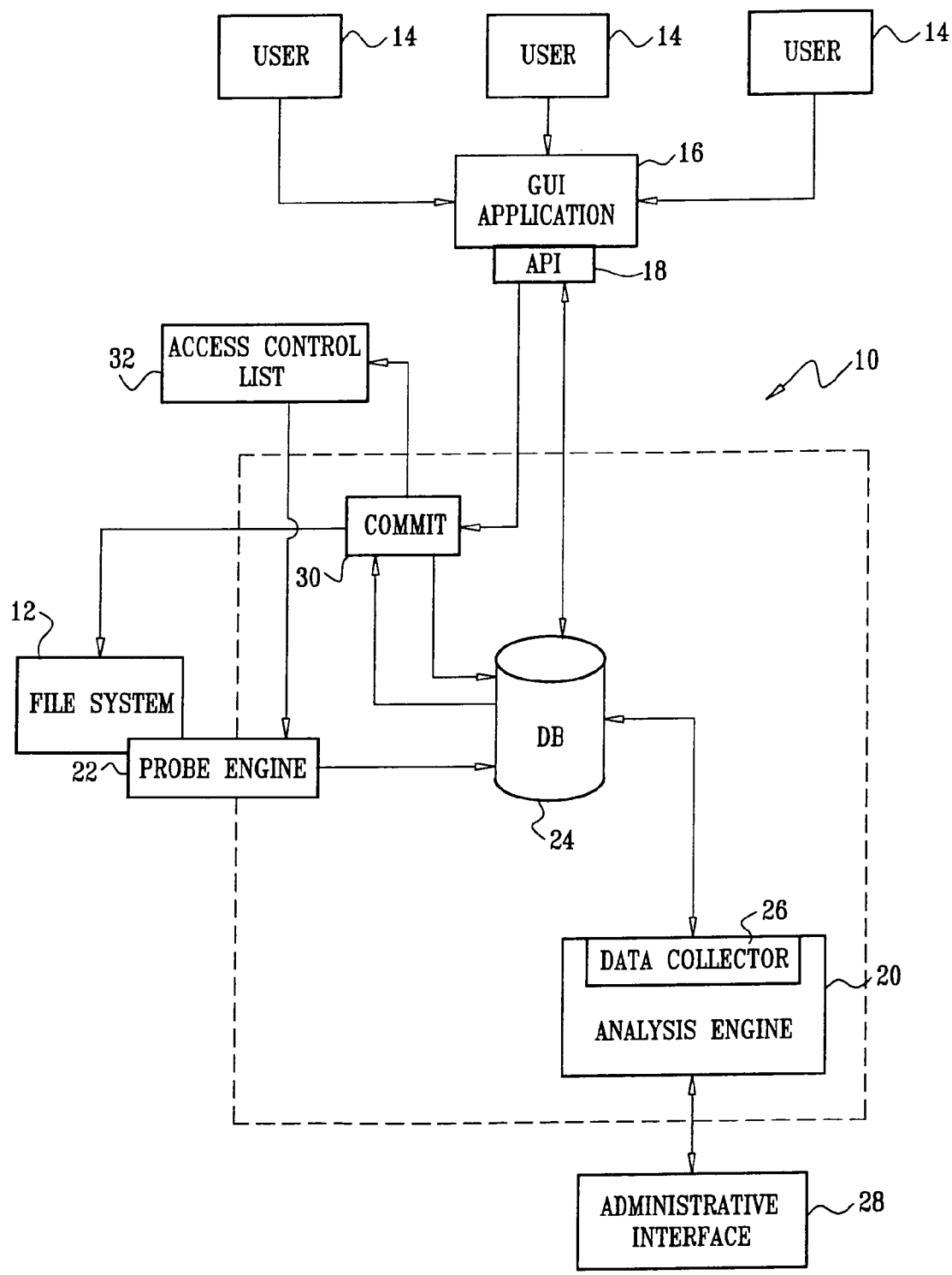
FIG. 1 is a block diagram of a data processing system, wherein data access control policies are automatically defined and managed in accordance with a disclosed embodiment of the invention.

Turning now to the drawings, reference is initially made to FIG. 1, which is a block diagram of a data processing system 10 wherein data access control policies are automatically defined and managed in accordance with a disclosed embodiment of the invention. The system 10 may be implemented as a general purpose computer or a plurality of computers linked together in a network, for example the Internet.

Organization-wide data storage accessible by the system 10 is represented by an organizational file system 12. The organizational file system 12 may comprise one or more co-located storage units, or may be a geographically distributed data storage system, as is known in the art. There is no requirement that individual storage units of the organizational file system 12 have the same capabilities.

The organizational file system 12 may be accessed by any number of users 14 using a graphical user interface application 16 (GUI), which relates to other elements of the system 10 via an application programming interface 18 (API). The users 14 are typically members of the organization, but may also include outsiders, such as customers. The graphical user interface application 16 is the interface of the management system, through which the users 14 can receive the results of their actual usage analysis, as determined an analysis engine 20. In some embodiments sufficiently qualified users, e.g., administrative personnel, can view their current status, and can view changes recommended by the system. Such users may be authorized to accept or reject recommended changes. Prior to selecting any recommended changes, qualified users have the ability to view the effect of recommended changes on the system. System administrators can then select or confirm the permission set that proves most suitable.

A probe engine 22 is designed to collect access information from the organizational file system 12 in an ongoing manner, filter out duplicate or redundant information units and store the resulting information stream in a database 24. The probe engine 22 is also utilized to collect the organization's current file security policy, the current structure of the organizational file system 12, and information about the users 14. The probe engine 22 can be implemented in various environments and architectures.

The analysis engine 20 is a specialized module that is at the heart of the system's ability to control storage access. The analysis engine 20 automatically proposes and revises the organization's security policy. The front end for the analysis engine 20 is a data collector 26, which efficiently records the storage access activities in the database 24. The output of the analysis engine 20 can be further manipulated using an interactive administrative interface 28 that enables system administrators to perform queries on the collected data. Using the administrative interface 28, the administrators may modify the automatically proposed security policy if necessary, and finally activate the new or revised policy.

Related to the analysis engine 20 is a commit module 30, which verifies a proposed security policy, using data collected prior to its implementation. The commit module 30 references an access control list 32 (ACL). Activities of the commit module 30 are described in further details hereinbelow.

Probe Engine.

Probe engines are tailored to particular operating systems and environments. The following are described by way of example and not of limitation.

Win-Probe Architecture.

Figure 2:
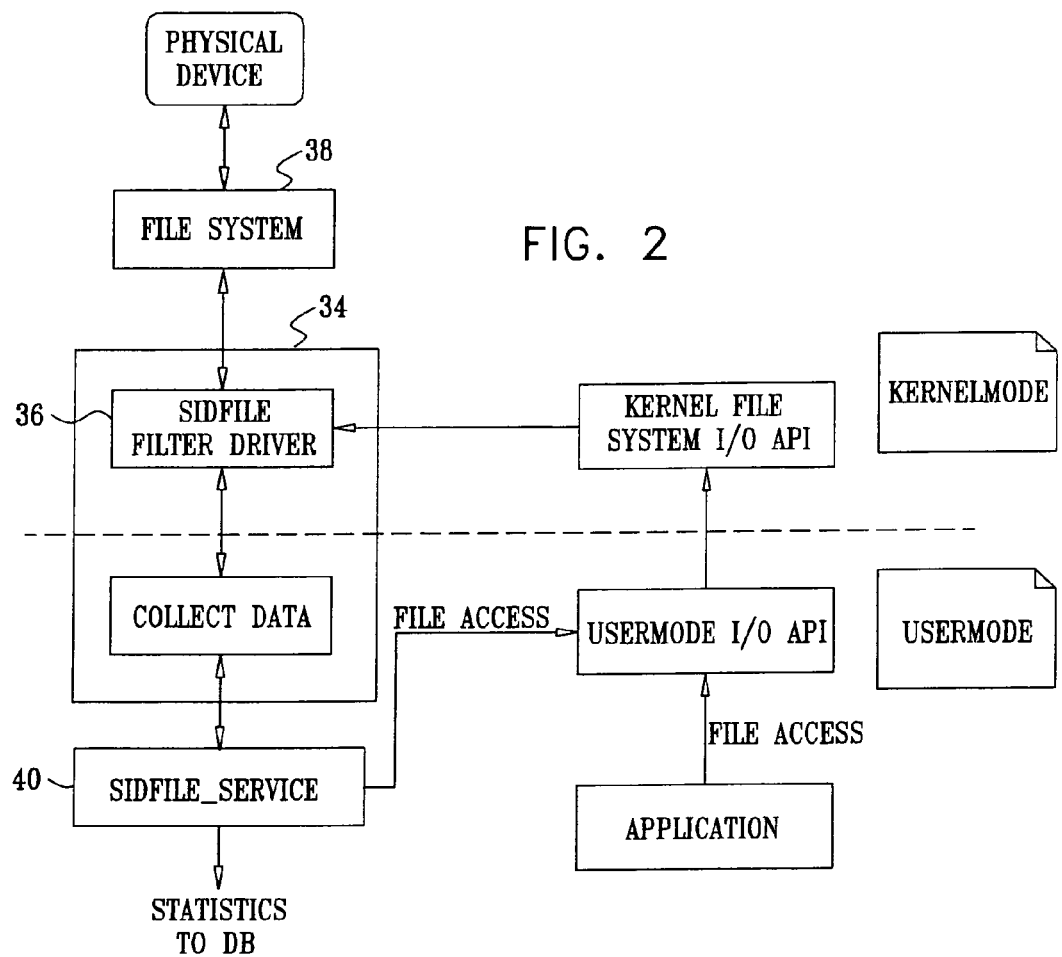
FIG. 2 is a block diagram illustrating a probe engine in the system shown in FIG. 1 in accordance with a disclosed embodiment of the invention.

Reference is now made to FIG. 2, which is a block diagram illustrating one embodiment of the probe engine 22 (FIG. 1) in accordance with a disclosed embodiment of the invention. This embodiment, termed herein the "Win-Probe module," acts as a probe for the Microsoft Windows® platform. It is responsible for operating system level monitoring on local file systems, which are components of the organizational file system 12 (FIG. 1). Typically, there is one Win-Probe module that services all Windows computers in the organization. The Win-Probe module operates in parallel with probe engines adapted to other operating systems. Alternatively, a complex organization may require more than one Win-Probe module in order to assure efficient operation. The Win-Probe module has a file system filter 34 (SIDFILE) that employs a kernel-mode filter driver 36 for intercepting activity of a local file system 38 and for logging it alongside security information regarding the activity intercepted. A service 40 (SID-FILE_SERVICE) interacts with the filter driver 36 and polls for new log entries. The log entries are filtered by the service 40, The service 40 is responsible for compiling statistics from the filtered log entries, and forwarding both the raw log entries and their statistics to the database 24 (FIG. 1) for further processing. The filter 34 is transparent to the operating system, and its overhead is limited to extraction of associated security attributes per input/output (I/O) operation and logging. Communication between the filter driver 36 and the service 40 is accomplished using operating system mechanisms such as device I/O Control, and predefined control codes, e.g., "collect statistics".

Network Attached Storage Probe Architecture.

Figure 3:
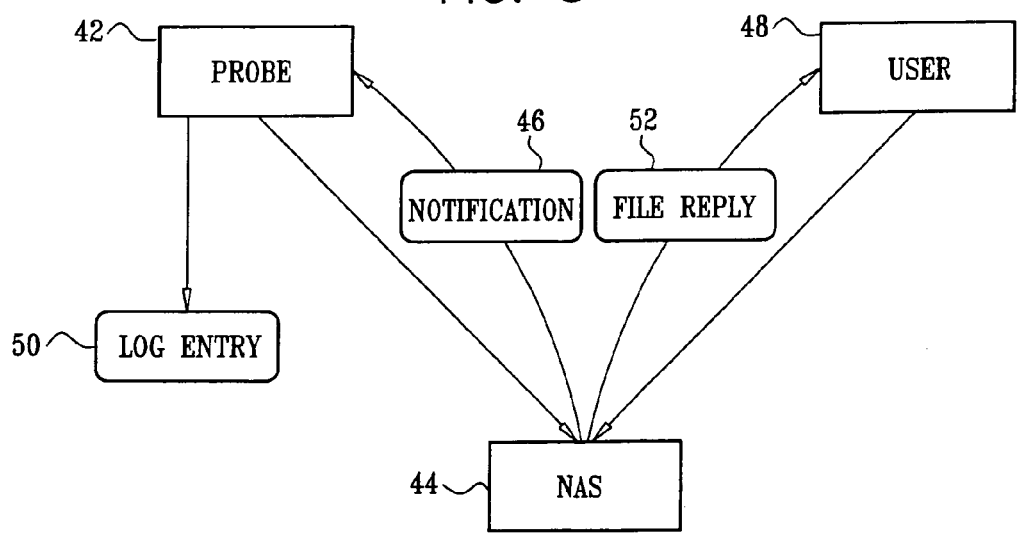
FIG. 3 is a block diagram illustrating another version of a probe engine in the system shown in FIG. 1 in accordance with a disclosed embodiment of the invention.

Reference is now made to FIG. 3, which is a block diagram illustrating another embodiment of the probe engine 22 (FIG. 1), which is adapted to networked devices in accordance with a disclosed embodiment of the invention. A network attached storage (NAS) probe 42 is responsible for collecting access data from a NAS storage device 44. In some embodiments, one NAS probe may serve an entire organization. Alternatively, a plurality of NAS probes may be provided. The probe 42 interacts with the NAS device 44 using a dedicated, typically vendor-specific protocol. The protocol causes the NAS device 44 to send a notification 46 on a requested file access operation originating from a user 48 to the probe 42. The probe 42 either enables the requests to be satisfied by the NAS device 44, or denies access to the NAS device 44, according to a current governing policy. A log entry 50 is made by the probe 42, documenting an enabled request, and the request is passed to the NAS device 44 for conventional processing, in accordance with its own operating system. In some embodiments, a denied request is simply discarded. Alternatively, denied requests may be logged, in order to assist in tracking abnormal user behavior. In any case, the user 48 receives a reply 52 to its request, either in the form of a denial of access, or an indication of the result of the requested file operation by the NAS device 44. In either case, there is minimal performance impact. Since the NAS device 44 has its own proprietary operating system, all driver-related issues, e.g., extraction of system identifiers (SID's), user identifiers (UID's), and the type of file access requested, are handled on the NAS device 44 and simply logged by the probe 42.

Analysis Engine.

As noted above, the analysis engine 20 (FIG. 1) is at the heart of the system 10. The statistics on actual accesses of the users 14, including every member of an organization to each of the data storage elements in the organizational file system 12, reported by the probe engine 22, are used to perform a simultaneous automatic bi-clustering of the users and the data storage elements. The bi-clustering is done in such a manner that users who are members of the same user cluster share a similar data access profile, and data storage elements (files or directories) that are members of the same data cluster are accessed mostly by users having similar access profiles. The clusters provide a global picture of the organizational structure. The analysis engine 20 can also develop from the clustering results a local measure of similarity among users and a local measure of similarity among the data elements that belong to the same cluster. Moreover, the clustering process reliably predicts future data storage access by organization members. It can be assumed, with a high level of confidence, that if one of the users 14 has not accessed a certain file or storage element, and similar users have not accessed similar files, then that one user will not need access rights to the corresponding storage element in the near future. The analysis engine 20 thus provides IT administrators a clear global picture of information usage patterns and can offer detailed recommendations for security policy optimization. At the same time, administrators are alerted to anomalous user behavior. The analysis engine 20 can also automatically build a complete forensic trail of any suspicious activities. The result is a dramatically greater ability to ensure compliance with access and privacy policies, and to assure appropriate information usage without imposing additional administrative burdens on IT personnel.

Bi-Clustering Algorithm.

The following clustering algorithms are used in the current embodiment. However, the invention is not limited to the particular algorithms described hereinbelow. It will be apparent to those skilled in the art that other clustering algorithms can be applied to the data obtained by the probe engine 22 (FIG. 1) in order to obtain comparable results.

Assume we have a joint distribution of two discrete random variables, X and Y, denoted by $p(x,y)=p(X=x,Y=y)$. In our case, X stands for the set of users in the organization, and Y is the set of file directories accessed by the members of the organization. The value $p(x,y)$ is the normalized number of times that user x approached the data storage element y during an enrollment phase. Based on the collected data, organized in a contiguity table of the $p(x,y)$, we want to discover the essential underlying structure of the two sets and the mutual relations between them. More precisely, we want to cluster the random variables X and Y into disjoint sets of similar elements. A clustering of the random variable X is a partitioning of the elements of X into disjoint clusters denoted by X' and in a similar manner denoting a partition of Y by Y'.

Assuming that the number of clusters is predefined (as part of the system configuration parameters), we want to find clusterings X' and Y' such that the mutual information I(X';Y') between the user clusters and the data clusters is maximized. In other words, the system utilizes the mutual information criterion as a cost function to assess the quality of various clustering structures.

The mutual information is defined in the following way:

$$I(X;Y) = -\sum_{x,y} p(X=x, Y=y) \log p(X=x, Y=y). \quad (1)$$

The mutual information encapsulates the amount of uncertainty in one of the random variables that is revealed when the other random variable is observed. We also define two related concepts that are used below. Let $P=(P(1), \ldots, P(n))$ and $Q=(Q(1), \ldots, Q(n))$ be two discrete probability distributions. The relative entropy (Kullback-Leibler divergence) between the distributions P, Q is:

$$KL(P \| Q) = \sum_i P(i) \log(P(i)/Q(i)). \quad (2)$$

The Jensen-Shannon divergence between the distributions P, Q according to a mixture coefficient c is:

$$JS(P,Q) = cKL(P \| cP + (1-c)Q) + (1-c)KL(Q \| cP + (1-c)Q). \quad (3)$$

The next step is to utilize the mutual information criterion to find the optimal biclustering. Different strategies are used for the user set X and the data set Y. In the case of user set X, there is no current structure that it is necessary to maintain. However, in some embodiments it may be desirable to retain an organizational user structure. In contrast, the data file system is based on a tree structure, which we do want to maintain, as it is likely to reflect an operational similarity between nearby directories in the tree. Therefore, storage element clustering is accomplished by essentially pruning the tree. The process is described in further detail hereinbelow.

User Clustering.

Figure 4:
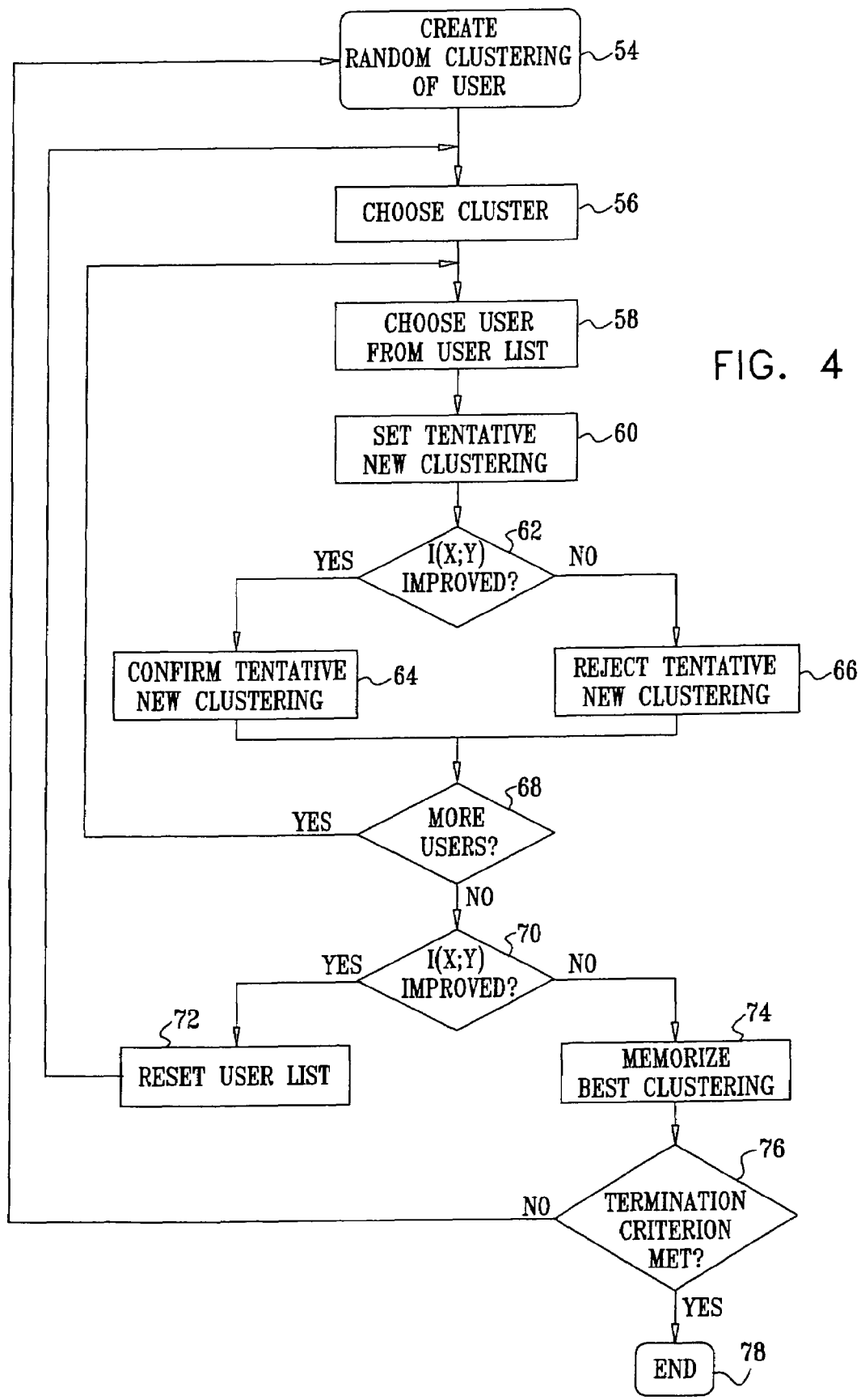
FIG. 4 is a flow chart describing a method of user clustering in accordance with a disclosed embodiment of the invention.

Reference is now made to FIG. 4, which is a flow chart describing a method of user clustering in accordance with a disclosed embodiment of the invention. The method begins with a random solution and then sequentially improves the result in a monotonic manner.

At initial step 54 a random partitioning of the user list into a predetermined number of clusters is chosen as a starting point. This partitioning will be used in a current set of cycles as described below. For each user x, the probability distribution p(y|x) stands for the normalized data access activity of the user x, i.e., p(y|x) is the number of times the user x accessed data element y normalized by the entire number of data activities performed by x in the enrollment period. For each randomly constructed cluster C, we define p(y|C) to be the average of the conditional probability distributions p(y|x) related with the users that are members of the cluster C.

Next, at step 56 one of the clusters established in initial step 54 is selected randomly.

Next, at step 58 one of the users is selected. Step 58 is performed iteratively, and the users are evaluated cyclically. However, the order of evaluation in a cycle is not critical.

Next, at step 60 the current user x is tentatively moved from its current cluster to the cluster selected in step 56 to form a tentative new clustering of the users.

Control now proceeds to decision step 62, where it is determined whether the global mutual information I(X;Y) of the new clustering is larger than that of the current clustering. We define a distance between a user x and a cluster C that is composed from c users, in the following way:

$$d(x, C) = (c+1)JS(p(y|x), p(y|C)) \quad (4)$$
$$= KL(p(y|x) \| (p(y|x) + cp(y|C))/(c+1)) +$$
$$c * KL(p(y|c) \| (p(y|x) + cp(y|C))/(c+1))).$$

Each user x is merged into the cluster C, which minimizes the distance d(x,C). The conditional access probability p(y|C) is modified according to the statistics of the new member x. It can be verified that minimizing the distance d(x,C) is equivalent to maximizing the mutual information between the clusters and the data activities.

If the determination at decision step 62 is affirmative, then control proceeds to step 64. The current user x remains in the cluster that was selected in step 56, and the tentative new clustering established in step 60 is confirmed.

If the determination at decision step 62 is negative, then control proceeds to step 66. The current user x is returned to the cluster from which it was selected, and the tentative new clustering established in step 60 is rejected.

In either case, control now proceeds to decision step 68, where it is determined whether more users remain to be evaluated in the current cycle. If the determination at decision step 68 is affirmative, then control returns to step 58.

If the determination at decision step 68 is negative, then control proceeds to decision step 70, where it is determined whether the last cycle yielded any improvement in mutual information.

If the determination at decision step 70 is affirmative, then an optimum clustering may not yet have been achieved. At step 72, the user list is reset to begin another cycle in the current set of cycles. Control returns to step 56, and the new cycle begins by choosing a new cluster, using the same random partitioning established in initial step 54.

If the determination at decision step 70 is negative, then control proceeds to step 74. The best clustering achieved in the current set of cycles is memorized.

Control now proceeds to decision step 76, where it is determined whether a termination criterion has been met. The termination criterion may be completion of a predetermined number of iterations of initial step 54. Alternatively, a performance indicator can be used as a termination criterion.

If the determination at decision step 76 is negative, then control returns to initial step 54, and the method is repeated, choosing a new starting point.

If the determination at decision step 76 is affirmative, then control proceeds to final step 78. The best result obtained in the clusterings memorized in iterations of step 74 is reported as a final clustering that maximizes the mutual information between the user clusters and the data clusters.

Data Element Clustering.

Figure 5:
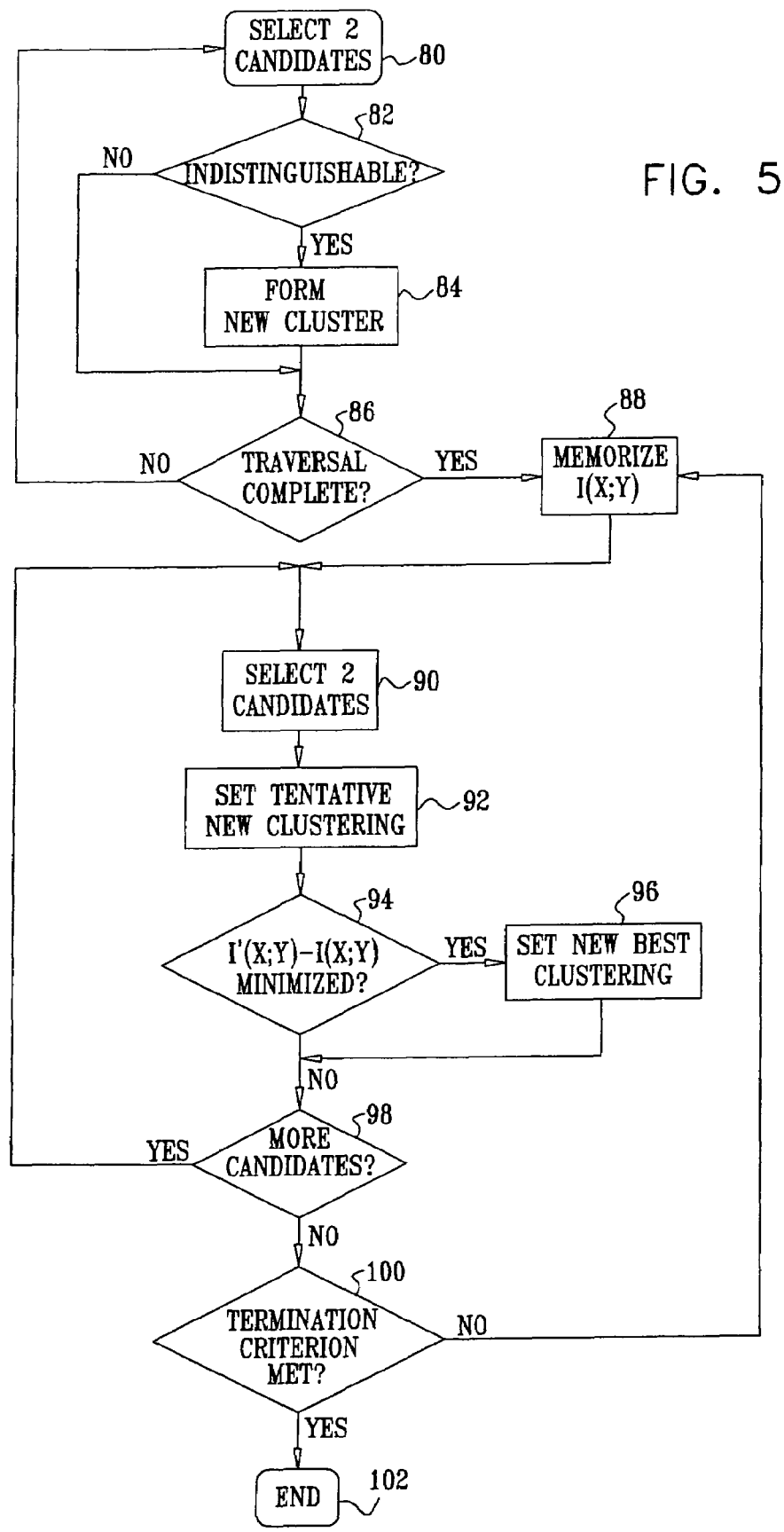
FIG. 5 is a flow chart describing a method for storage element clustering in accordance with a disclosed embodiment of the invention.

Reference is now made to FIG. 5, which is a flow chart describing a method for storage element clustering in accordance with a disclosed embodiment of the invention. This is an agglomerative method based on merging clusters that are represented by sibling elements in the data file tree. It is assumed that user clustering as described above with reference to FIG. 4 has been performed. In an initial phase, there is merger between sibling directories or parent-offspring directories that cannot be distinguished in terms of user access events. This stage results in a directory tree that has been pruned into a tractable number of elements. In the next phase, all leaves of the current pruned tree are visited, and there is further merger between two sibling or parents-offspring directories such that a minimal reduction in the mutual information between the user clusters and the data clusters results. The process iterates until a termination criterion is satisfied, e.g., when a predetermined number of clusters is obtained or when the current mutual information is decreased below a predetermined threshold. The method is now presented in greater detail.

Initial step 80 begins a traversal of the directories of the file tree. In selecting candidates for clustering, parent-offspring directories and sibling directories and clusters thereof are considered, and are referred to collectively as "neighbors". The traversal order is not critical, so long as all data elements are visited and all mutual neighbors are evaluated. Many known algorithms for tree traversal may be employed. Two neighbors are selected.

Control now proceeds to decision step 82, where it is determined whether the current candidates are indistinguishable, or nearly indistinguishable according to predetermined criteria of similarity, in terms of user access events.

If the determination at decision step 82 is affirmative, then control proceeds to step 84. The candidates are merged together to form a new data cluster. This data cluster is treated as a single storage element or neighbor in subsequent iterations of initial step 80.

After performing step 84, or if the determination at decision step 82 is negative, control proceeds to decision step 86, where it is determined whether traversal of the data file tree is complete. If the determination at decision step 86 is affirmative, then control returns to initial step 80 to begin another iteration.

If the determination at decision step 86 is negative, then one phase of the method is complete, resulting in a pruned directory tree. In general, the directories and clusters of directories in the pruned tree constitute a tractable number of elements.

Control now proceeds to step 88, which begins another phase of the method, wherein the pruned tree is traversed again, with additional merging of candidates in a manner that leads to a minimal reduction in the mutual information $I(X;Y)$. The mutual information $I(X;Y)$ between the user clusters resulting from the method described with reference to FIG. 4 and the data clusters of the current pruned tree is memorized.

Next, at step 90, two candidates are selected. As noted above, these candidates can be clusters, directories, or combinations thereof, so long as the candidates have a sibling or parent-child relationship.

Next, at step 92 the current candidates are tentatively merged to form a new clustering of the users and data elements. The mutual information $I'(X;Y)$ of the tentative arrangement is determined.

Control now proceeds to decision step 94, where it is determined if the reduction in mutual information $I'(X;Y)-I(X;Y)$ caused by the tentative clustering is less than the reduction of mutual information caused by the best previous tentative clustering. This determination will always be affirmative on the first iteration of decision step 94.

If the determination at decision step 94 is affirmative, then control proceeds to step 96. The current tentative clustering is memorized, and set as a high water mark. It is the best new clustering thus far available.

After performing step 96, or if the determination at decision step 94 is negative, control proceeds to decision step 98, where it is determined if more candidates remain to be evaluated in the tree. If the determination at decision step 98 is affirmative, then control returns to step 90.

If the determination at decision step 98 is negative, then control proceeds to decision step 100, where it is determined if a termination criterion has been met. This criterion can be the establishment of a predetermined number of new clusters. Alternatively, the method may terminate when the current best reduction in mutual information is less than a predetermined threshold.

If the determination at decision step 100 is negative, then the method is repeated, using the mutual information of the current best clustering as a starting point. Control returns to step 88, where a new value of the mutual information $I(X;Y)$ is set.

If the determination at decision step 100 is affirmative, then control proceeds to final step 102. The clustering last stored at step 96 is reported as an optimum data element clustering.

At the end of the clustering algorithm, both the users and the data storage elements are arranged in disjoint clusters. A hierarchical tree structure is maintained among the data storage elements, while the users are distributed among a user space without having a hierarchical arrangement. A robust similarity measure between users in the organization can then be extracted. It is said that users behave similarly if they belong to the same user cluster, which indicates that the two users are accessing similar portions of the data-storage systems. Two directories or other storage elements are considered similar if they belong to the same data cluster.

Storage Access Control.

The clustering obtained using the method described above with reference to FIG. 5 can be used to automatically eliminate unnecessary access permissions. For example, permission for a user x to access a storage element y is eliminated if the user x has not accessed the element y (nor elements similar to y) during an enrollment period. It is predicted that the user x will not need to access the element y in the near future. The prediction is based on the access profile of similar members of the organization. It can be assumed that if no users with a similar access profile to the element y, who are thus in the same cluster as the user x, have accessed the element y, nor accessed storage elements similar to the element y, then the user x will not access the element y in the near future. Therefore, in order to increase the level of organizational data security, access permission can be canceled for the user x with respect to the element y. Review of the users is conducted iteratively at predetermined time intervals, and the access policy updated accordingly.

Semi-Automatic Clustering.

In the previous section a description was provided of how the user-data clustering approach can be utilized to define an access control policy that reflects the actual structure of the organization. Recorded data activities are only one of the sources of information that can be extracted to define the optimal data access control policy. In order to propose a new or updated data access policy, the current user-data group structure and the current data security policy should also be taken into consideration. Another major source of knowledge about the-organization is the current (manually set) access control list 32 (FIG. 1). The ACL can be viewed as a set of pairs, where each pair consists of a group of users and a group of data elements that can be accessed by the user group. Even though the current ACL may contain many errors, it is reasonable to assume that it is still highly correlated with the desired control policy. The procedure presented below can use the unsupervised clustering procedure discussed above to modify the current ACL and thereby obtain an improved policy. The organizational structure learned from the recorded user access data is then used to eliminate unnecessary data access permissions. The algorithm is based on the current ACL, and operates separately for each user-data group in the following manner: for each user we check whether access to one of the data elements defined in the pair was recorded. If not, we check whether a similar user accessed the data element during the enrollment period. Here similarity has the same meaning as given above. If no such user was found, it can be concluded that the particular user will not need to access the data element in the near future. If this is also the case for the data elements appearing in the data group, we eliminate the user from the access control pair. A second phase of the process is applied to eliminate data elements from the access control pair, as explained below.

Reference is now made to FIG. 6, which is a flow chart illustrating a method of partially supervised file access control in accordance with a disclosed embodiment of the invention. The steps of the method are shown in an exemplary sequence in FIG. 6 for clarity of presentation. However, it will be evident to those skilled in the art that many of them can be performed in parallel, asynchronously, or in different orders.

The method begins at initial step 104. The biclustering methods described above with reference to FIG. 4 and FIG. 5 are performed and applied.

Next, at step 106 an access control unit is selected from the ACL. This unit is a pair, composed of a group of users and a group of directories.

Next, at step 108 a user is chosen from the users of the current access control unit.

Next, at step 110 a data element is chosen from the current access control unit.

Control now proceeds to decision step 112, where it is determined if the current user has accessed the current data element.

If the determination at decision step 112 is affirmative, then no modification of the ACL need be made with respect to the current user. Control proceeds to step 114, which is described below.

If the determination at decision step 112 is negative, then users determined (in the clustering procedure performed in initial step 104) to be similar to the current user are evaluated. Control proceeds to step 116. A similar user is selected.

Control now proceeds to decision step 118, where it is determined if the current similar user has accessed the current data element.

If the determination at decision step 118 is affirmative, then, based on similarity of access needs between the current user and the current similar user, no modification of the ACL need be made with respect to the current user. Control proceeds to step 114.

If the determination at decision step 118 is negative, then at decision step 120 it is determined if there are more similar users to be considered.

If the determination at decision step 120 is affirmative, then control returns to step 116.

If the determination at decision step 120 is negative, then at step 122 the current user is removed from the current access control unit.

Next, at decision step 124 it is determined if more users in the current access control unit remain to be evaluated. If the determination at decision step 124 is affirmative, then control returns to step 108

If the determination at decision step 124 is negative, then, at decision step 126 it is determined if more access control units remain to be evaluated. If the determination at decision step 126 is affirmative, then control returns to step 106 to begin a new iteration.

If the determination at decision step 126 is negative, then control proceeds to final step 128. The storage access control can now incorporate the ACL list as modified.

Step 114, referenced above, begins a phase of the algorithm, which concerns the status of the current data element in the current access control unit. This phase is performed only if neither the current user nor any similar user has accessed the current data element. The purpose of the following steps is to investigate whether data elements that are considered to be similar to the current data element (according to the clustering procedure performed in initial step 104) have been accessed by any of the users in the current access control unit. If not, then the current data element is removed from the current access control unit. Once this action is accomplished, no member of the current user group can thereafter access the current data element. A similar data element is selected from the clustering performed in initial step 104.

Next, at step 130 a user is again selected from the current access control unit. It is intended that all users in the current access control unit be subject to evaluation in iterations of step 130.

Control now proceeds to decision step 132, where it is determined if the current user has accessed the current similar data element. If the determination at decision step 132 is affirmative, then there is no need to remove the current data element from its access control unit. Control proceeds to decision step 124, which has been described above.

If the determination at decision step 132 is negative, then at decision step 134 it is determined if there are more users in the current access control unit. If the determination at step 134 is affirmative, then control returns to step 130.

If the determination at step 134 is negative, then at decision step 136 it is determined if there are more similar data elements to be tested against the users in the current access control unit.

If the determination at decision step 136 is affirmative, then control returns to step 114.

If the determination at decision step 136 is negative, then all users of the current access control unit have been tested for access against all data elements that are similar to the current data element (chosen in the last iteration of step 110). No access has been found. At step 137 the current data element is now eliminated from the current access control unit.

Control now proceeds to decision step 138, where it is determined if there are more data elements in the current access control unit. If the determination at decision step 138 is affirmative, then control returns to step 110 to begin a new iteration, using a different data element from the current access control unit.

If the determination at decision step 138 is negative, then control proceeds to decision step 124, which has been described above.

Virtual Commit for Verifying a Proposed Policy.

Referring again to FIG. 1, the clustering procedures described above are applied to the storage access activities collected during an enrollment or training period for the system. These procedures may be repeated from time to time, for example, following mergers and acquisitions in the underlying organization. It is desirable to assure that a proposed or tentative new or updated access control policy is valid in terms of user activity occurring following the enrollment period. Data collected after the enrollment period are used to verify the validity of the tentative policy prior to its institution. This function is carried out by the commit module 30, which records user access activities and detects violations of the tentative policy. If the user activities would not violate the tentative policy, then it is approved as a definitive storage access control policy. Otherwise it is rejected or returned for further evaluation or revision. The commit module 30 thus provides a cross-validation mechanism to check the quality of a proposed storage access control policy before its actual implementation.

Tracking abnormal behavior.

Another major aspect of the data analysis performed on the recorded data is detection and tracking of abnormal behavior. The commit module 30 is adapted to perform this function following the implementation of a storage access control. Abnormal behavior may be identified if a user acts inconsistently with other users belonging to the same user cluster.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An access control method for dynamically establishing rules for governing control of access to data stored on at least one storage device by a multiplicity of persons in an organization, said method being implemented on at least one computer, said method comprising:

monitoring and recording actual access events of multiple persons to multiple data elements in said data stored on said at least one storage device over a learning period;

based on said monitoring and recording said actual access events of said multiple persons to said multiple data elements in said data stored on said at least one storage device over said learning period, creating a data access profile for each of said multiple persons and, based on said data access profiles, defining multiple groups each including a plurality of persons among said multiplicity of persons, each group being characterized by the extent of its monitored and recorded actual access events during said learning period to a corresponding aggregation of data elements in said data stored on said at least one storage device automatically defining access rules permitting the plurality of persons in each of said multiple groups to access the corresponding aggregation of data elements in said data stored on said at least one storage device for which said monitored and recorded actual access events occurred during said learning period; and during at least one period following said learning period, automatically redefining said access rules by narrowing said aggregation of data elements in said data stored on said at least one storage device accessible to the plurality of persons in a group by removing permission to access data elements in said data stored on said at least one storage device which were not accessed by persons in said group during said at least one period following said learning period, said step of defining multiple groups being performed iteratively, wherein said data access profiles are redetermined at each iteration thereof and said access rules are updated following each said iteration.

2. The method according to claim 1, wherein said access rules permit access by one of said plurality of persons in said group to said aggregation of data elements accessible to the plurality of persons in said group, only if at least one of said aggregation of data elements accessible to the plurality of persons in said group has been accessed by said one of said plurality of persons in said group.

3. The method according to claim 1, wherein said access rules permit access by said plurality of persons in said group to said aggregation of data elements accessible to the plurality of persons in said group, only if at least one of said aggregation of data elements accessible to the plurality of persons in said group has been accessed by at least one of said plurality of persons in said group.

4. The method according to claim 1, further comprising the step of deriving a structure of said data responsively to said step of defining multiple groups.

5. The method according to claim 1, further comprising the step of deriving patterns of usage of said data by said users responsively to said step of defining multiple groups.

6. The method according to claim 5, further comprising the step of detecting aberrant ones of said patterns of usage.

7. The method according to claim 1, wherein said step of automatically defining access rules comprises the steps of:

proposing a tentative version of said access rules;

monitoring and recording subsequent actual access events to said aggregation of data elements by said multiple persons;

determining that said subsequent actual access events are in accordance with said tentative version of said access rules; and responsively to said step of determining approving said tentative version as a definitive version of said access rules.

8. The method according to claim 1, further comprising the step of interactively modifying said access rules.

9. The method according to claim 1, wherein said step of automatically defining access rules is performed substantially without human intervention.

10. The method according to claim 1, further comprising the steps of:

referencing an access control list comprising at least one group of said multiple groups and said corresponding aggregation of data elements;

detecting an absence of actual access events by members of said group to at least one data element in said corresponding aggregation of data elements; and responsively to said step of detecting, removing at least a portion of said plurality of persons from said group and removing at least a portion of said aggregation of data elements from said corresponding aggregation of data elements.

11. A computer software product, including a computer-readable storage medium in which computer program instructions are stored, which instructions, when read by a computer, cause the computer to perform a method for dynamically establishing rules which can be used to govern control of access to data stored on at least one storage device by a multiplicity of persons in an organization, said method comprising:

monitoring and recording actual access events of multiple persons to multiple data elements in said data stored on said at least one storage device over a learning period;

based on said monitoring and recording said actual access events of said multiple persons to said multiple data elements in said data stored on said at least one storage device over said learning period, creating a data access profile for each of said multiple persons and, based on said data access profiles, defining multiple groups each including a plurality of persons among said multiplicity of persons, each group being characterized by the extent of its monitored and recorded actual access events during said learning period to a corresponding aggregation of data elements in said data stored on said at least one storage device;

automatically defining access rules permitting the plurality of persons in each of said multiple groups to access the corresponding aggregation of data elements in said data stored on said at least one storage device for which said monitored and recorded actual access events occurred during said learning period; and during at least one period following said learning period, automatically redefining said access rules by narrowing said aggregation of data elements in said data stored on said at least one storage device accessible to the plurality of persons in a group by removing permission to access data elements in said data stored on said at least one storage device which were not accessed by persons in said group during said at least one period following said learning period said step of defining multiple groups being performed iteratively, wherein said data access profiles are redetermined at each iteration thereof and said access rules are updated following each said iteration.

12. The computer software product according to claim 11, wherein said access rules permit access by one of said plurality of persons in said group to said aggregation of data elements accessible to the plurality of persons in said group, only if at least one of said aggregation of data elements accessible to the plurality of persons in said group has been accessed by said one of said plurality of persons in said group.

13. The computer software product according to claim 11, wherein said access rules permit access by said plurality of persons in said group to said aggregation of data elements accessible to the plurality of persons in said group, only if at least one of said aggregation of data elements accessible to the plurality of persons in said group has been accessed by at least one of said plurality of persons in said group.

14. The computer software product according to claim 11, wherein said step of automatically defining access rules comprises the steps of:

proposing a tentative version of said access rules;

monitoring and recording subsequent actual access events to said aggregation of data elements by said multiple persons;

determining that said subsequent actual access events are in accordance with said tentative version of said access rules; and responsively to said step of determining approving said tentative version as a definitive version of said access rules.

15. The computer software product according to claim 11, wherein said step of automatically defining said access rules comprises the steps of:

referencing an access control list comprising at least one group of said multiple groups and said corresponding aggregation of data elements;

detecting an absence of actual access events by members of said group to at least one data element in said corresponding aggregation of data elements; and responsively to said step of detecting, removing at least a portion of said plurality of persons from said group and removing at least a portion of said aggregation of data elements from said corresponding aggregation of data elements.

16. Apparatus for dynamically establishing rules which can be used to govern control of access to data by a multiplicity of persons in an organization, said apparatus comprising:

at least one storage device operative to store said data; and at least one computer operative to perform the steps of:

monitoring and recording actual access events of multiple persons to multiple data elements in said data stored on said at least one storage device over a learning period;

based on said monitoring and recording said actual access events of said multiple persons to said multiple data elements in said data stored on said at least one storage device over said learning period creating a data access profile for each of said multiple persons and, based on said data access profiles, defining multiple groups each including a plurality of persons among said multiplicity of persons, each group being characterized by the extent of its monitored and recorded access events during said learning period to a corresponding aggregation of data elements in said data stored on said at least one storage device;

automatically defining access rules permitting the plurality of persons in each of said multiple groups to access the corresponding aggregation of data elements in said data stored on said at least one storage device for which said monitored and recorded actual access events occurred during said learning period; and during at least one period following said learning period, automatically redefining said access rules by narrowing said aggregation of data elements in said data stored on said at least one storage device accessible to the plurality of persons in a group by removing permission to access data elements in said data stored on said at least one storage device which were not accessed by persons in said group during said at least one period following said learning period said step of defining multiple groups being performed iteratively, wherein said data access profiles are redetermined at each iteration thereof and said access rules are undated following each said iteration.

17. The apparatus according to claim 16, wherein said access rules permit access by one of said plurality of persons in said group to said aggregation of data elements accessible to the plurality of persons in said group, only if at least one of said aggregation of data elements accessible to the plurality of persons in said group has been accessed by said one of said plurality of persons in said group.

18. The apparatus according to claim 16, wherein said access rules permit access by said plurality of persons in said group to said aggregation of data elements accessible to the plurality of persons in said group, only if at least one of said aggregation of data elements accessible to the plurality of persons in said group has been accessed by at least one of said plurality of persons in said group.

19. The apparatus according to claim 16, wherein said step of automatically defining access rules comprises the steps of:

proposing a tentative version of said access rules;

monitoring and recording subsequent actual access events to said aggregation of data elements by said multiple persons;

determining that said subsequent actual access events are in accordance with said tentative version of said access rules; and responsively to said step of determining approving said tentative version as a definitive version of said access rules.

20. The apparatus according to claim 16, wherein said step of automatically defining access rules comprises the steps of:

referencing an access control list comprising at least one group of said multiple groups and said corresponding aggregation of data elements;

detecting an absence of actual access events by members of said group to at least one data element in said corresponding aggregation of data elements; and responsively to said step of detecting, removing at least a portion of said plurality of persons from said group and removing at least a portion of said aggregation of data elements from said corresponding aggregation of data elements.

* * * * *